May 20, 1941.　　　　F. P. MARTIN　　　　2,242,917
MOWING MACHINE
Filed Oct. 3, 1938　　　　3 Sheets-Sheet 1

Fig. 1.

INVENTOR
Fred P. Martin.
BY Arthur C. Brown
ATTORNEY

May 20, 1941.  F. P. MARTIN  2,242,917
MOWING MACHINE
Filed Oct. 3, 1938   3 Sheets-Sheet 2
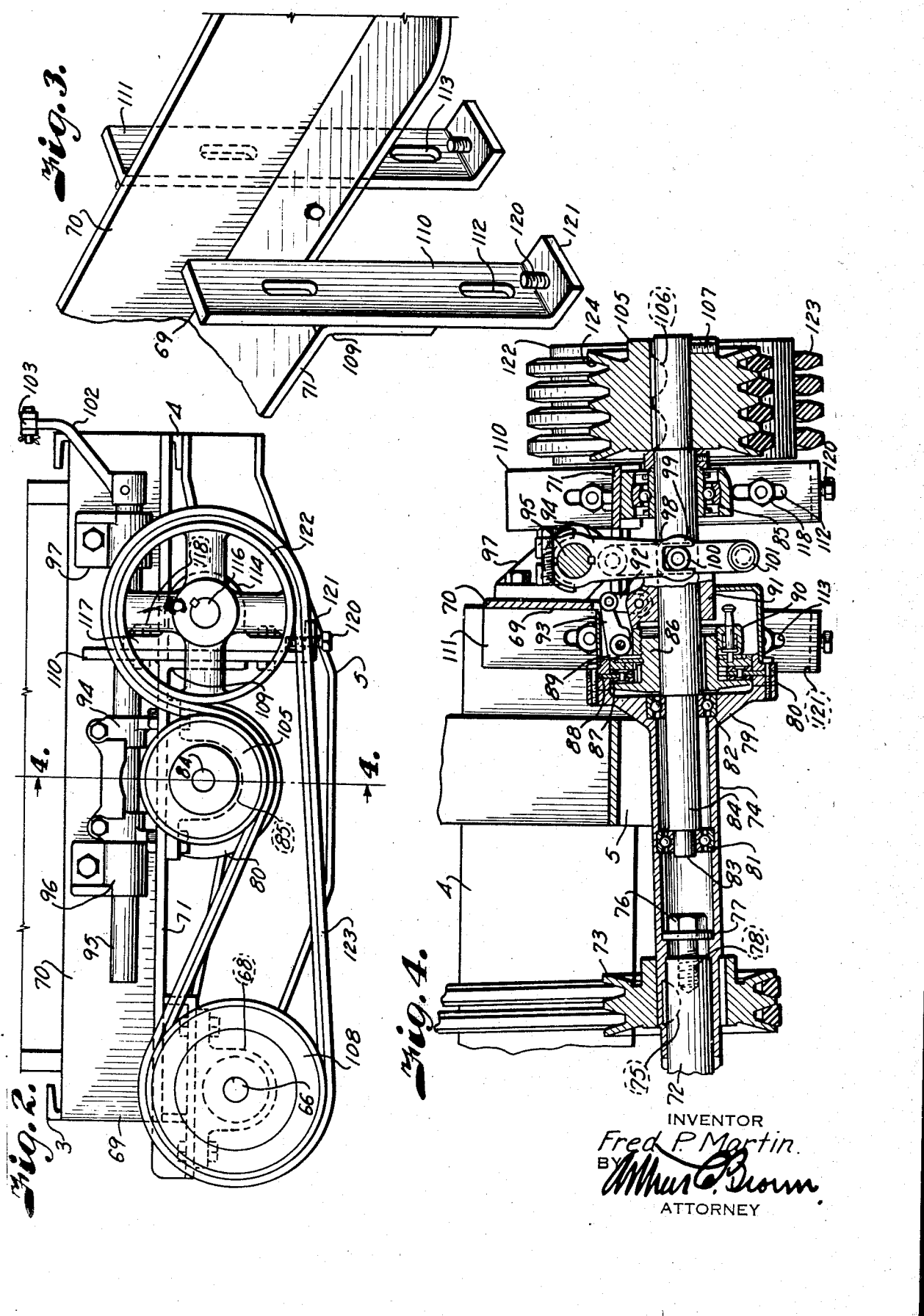
INVENTOR
Fred P. Martin.
BY
Arthur P. Brown
ATTORNEY

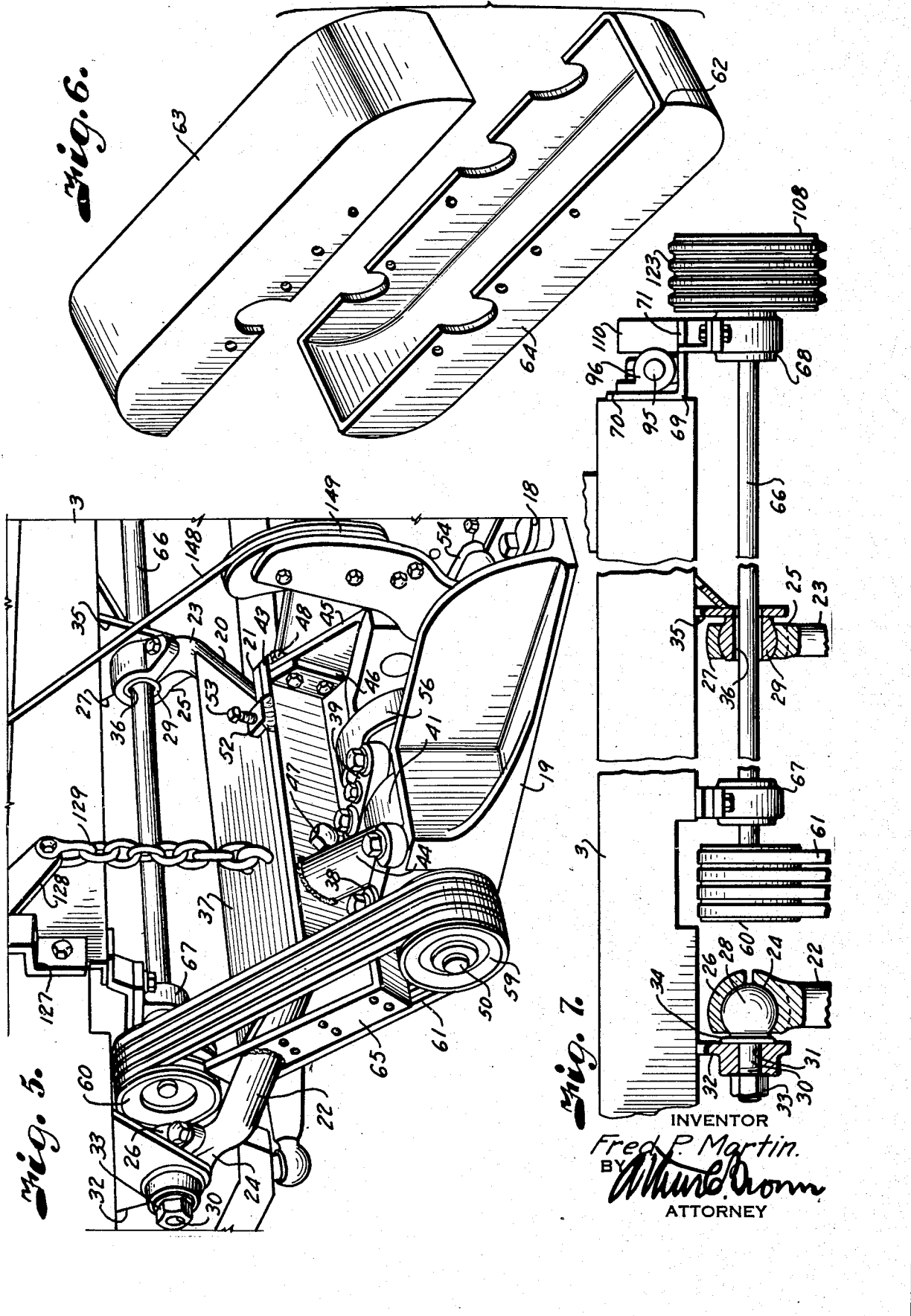

Patented May 20, 1941

2,242,917

UNITED STATES PATENT OFFICE 2,242,917

MOWING MACHINE

Fred P. Martin, Topeka, Kans.

Application October 3, 1938, Serial No. 233,007

12 Claims. (Cl. 56—25)

This invention relates to mowing machines of the power driven type, wherein the sickle is pivotally mounted on a shoe which, in turn, has swinging movement about a fixed axis so that the cutting height and angle of the sickle may be changed in accordance with the terrain being cut over.

In machines of this character, it has been the practice to drive the sickle actuating crank with a telescoping shaft having universal connections with the power and sickle crank shafts to compensate for the varying positions of the crank shaft with respect to the power shaft incidental to adjustment of the sickle.

Such construction is expensive, difficult to lubricate, wears rapidly, produces vibration and back lash, and requires considerable power to operate. Therefore, the principal object of the present invention is to provide a simple and less expensive driving connection which is readily lubricated, free of vibration, and requires less power to operate.

Other objects of the invention are to provide direct power take-off from the motor unit of the machine; to provide for mounting of the power shaft concentrically with the pivotal axis of the sickle shoe; to provide mounting of the crank shaft in the pivotal axis of the sickle; and to maintain fixed radial relationship between the power and sickle crank shafts.

It is also an object of the invention to provide means for tilting the sickle in a fore and aft direction.

In accomplishing these and other objects of the present invention hereinafter pointed out, I have provided improved details of structure, the preferred form of which is illustrated in the accompanying drawings, wherein:

Fig. 1 is a plan view of a power driven mowing machine embodying the features of the present invention, the outer end of the sickle being broken away, and a part of the drive belt housing shown in section.

Fig. 2 is a fragmentary elevational view of the front of the machine, particularly illustrating the power take-off for actuating the sickle.

Fig. 3 is a detail perspective view of the bearing supporting bracket for the idler pulley of the power take-off.

Fig. 4 is an enlarged longitudinal section through the power take-off on the line 4—4, Fig. 2, illustrating connection of the power take-off with the motor shaft and the clutch mechanism.

Fig. 5 is a fragmentary perspective view of the side of the machine showing the sickle mounting and the driving connection between the power and sickle crank shafts.

Fig. 6 is a detail perspective view of the parts of the belt housing, shown in disassembled spaced relation.

Fig. 7 is a fragmentary side elevational view of a portion of the machine particularly illustrating the ball and socket connection of the sickle shoe carrying yoke with the chassis frame.

Referring more in detail to the drawings:

1 designates a mowing machine including a chassis 2 having forwardly converging side sills 3 and 4 connected by cross members 5 to mount a motor unit 6 thereon. Also mounted on the sills to the rear of the motor unit is a platform 7 carrying an operator's seat 8.

The front end of the frame is carried upon an axle 9 having steering knuckles 10 mounting wheels 11, the knuckles 10 being connected through suitable mechanism with a steering wheel 12 that is supported on a post 13 in front of the operator's seat 8, as in conventional automotive design. The rear of the frame is carried upon a conventional axis 14 having wheels 15 that are driven from the motor unit 6 through a variable speed transmission 16 whereby the machine is adapted to be operated in the manner of an ordinary motor vehicle.

Located at one side of the platform intermediate the front and rear wheels 11 and 15 is a sickle unit 17 including a sickle bar 18 attached at its inner end to a shoe 19 swingingly supported by a yoke 20 from the chassis frame. The yoke 20 includes a plate 21 to which is connected outwardly diverging arms 22 and 23 terminating in ball sockets 24 and 25 which cooperate with caps 26 and 27 to engage balls 28 and 29 carried on the chassis, whereby the shoe is adapted for swinging movement in a vertical direction to raise and lower the heel of the sickle. The ball 28 is anchored by a threaded shank 30 extending through an opening 31 in a bracket plate 32 fixed to and depending below the side sill 3, as best shown in Figs. 1, 5 and 7, the shank 30 being retained by a nut 33 that is threaded thereon to draw a collar 34 of the ball against the bracket. The ball 29 is fixed to a similar bracket 35 attached to the side sill forwardly of the ball 28. The ball 29 is preferably welded directly to the bracket and provided with an axial opening 36 to pass a power shaft, as later described. The arms 22 and 23 of the yoke are preferably braced by a plate 37 having its ends welded to the arms and one edge thereof to the plate 21.

The shoe 19 carries spaced bearings 38 and 39 at the rear of the sickle and an axially aligned yoke 40 in front of the sickle to form hinging elements cooperating with bearings 41 and 42 carried on a plate 43. The bearing 41 engages between the bearings 38 and 39 and has a laterally extending neck 44 fixed to the plate 43 and the bearing 42 is carried on an arm 45 attached to a flange 46 of the plate. The plate 43 is adjusted on the plate 21 by a pivot member such as a bolt 47 extending through the respective plates at a point substantially in alignment with the rear edge of the sickle bar 18. The opposite end of the plate 43 is adjustably clamped to the plate 21 by clamping bolts 48 extending through slotted openings in the plate 44 and through registering apertures in the plate 21.

Extending through the bearing elements 38 and 39 and journalled within the bearing 41 is a crank shaft 50 pivotally connecting the sickle shoe. The bearing 42 is connected with the yoke 40 by a pivot member, such as a bolt 51.

The shoe is thus supported for pivotal movement about the axis of the crank shaft so that the cutting angle of the sickle may be adjusted through a range varying from a downward perpendicular position to an upper position with the toe of the sickle extending over the chassis frame.

In order to tilt the sickle in a fore and aft direction on the pivot 47, the upper edge of the plate 43 carries a lateral tongue 52 having a set screw 53 engaging the edge of the plate 21. It is thus apparent that by loosening the clamping bolts 48 and adjusting the set screw 53, the plate 43 may be moved on the pivot member 47 to change the attack angle of the sickle with respect to the horizontal.

The cutter bar of the sickle is connected by a pitman 54 with a wrist pin 55 eccentrically mounted on a head 56 of the crank shaft 50. The rear end of the crank shaft 50 projects from the bearing 38 and mounts a driven pulley 59 which is actuated from a driving pulley 60 through a plurality of belts 61 operating in grooves of the respective pulleys.

The pulleys including the belts are enclosed by a housing 62 including upper and lower sections 63 and 64 which are secured in assembled position to a bracket 65 carried on the arm 22.

The driving pulley 60 is fixed on a power shaft 66 extending through the opening 36 of the ball 29 and is rotatably retained within the pivotal axis of the yoke supporting arms by self-aligning bearings 67 and 68, the bearing 67 being attached to the underside of the chassis frame adjacent the ball and socket connection of the arm 22 and the bearing 68 is secured to the end of the cross member 69 which connects the ends of the side sills 3 and 4 as shown in Figs. 1 and 7.

The cross member 69 is shown as comprising an angle having a vertical flange 70 welded to the ends of the side sills and a horizontal flange 71 projecting forwardly to mount the power take-off whereby the sickle is operated from the motor unit, as now to be described.

The power take-off is best illustrated in Figs. 2 and 4, wherein 72 designates the forward end of the crank shaft of the motor unit which ordinarily mounts the fan belt pulley 73 and forms a connection for a starting crank. In the present instance, the projecting end of the crank shaft mounts a tubular extension 74 that is sleeved thereover and drivingly connected therewith by a key 75, the tubular extension being retained by a cap screw 76, the shank of which extends through a washer, having its periphery bearing against an internal shoulder 77 within the tubular extension, and into a socket 78 in the end of the crank shaft.

The outer end of the tubular extension has an annular flange 79 mounting a clutch housing 80. Supported in the forward end of the tubular extension are anti-friction bearings 81 and 82 centering the pilot 83 of a shaft 84 having its outer end journalled in a self-aligning anti-friction bearing 85 attached to the underside of the flange 71, as best shown in Fig. 4. Fixed to the shaft 84 within the clutch housing 80 is a clutch plate carrier 86 having plates 87 engaging a complementary plate 88 carried by the clutch housing. The plates 87 are moved into driving relation with the plate 88 by fingers 89 that are pivoted on a collar 90 threaded on the plate carrier. Slidably mounted on the shaft 84 is a collar 91 which is connected by links 92 with arms 93 of the clutch fingers 89. The collar 91 is operated by a shipper 94 which is fixed to a cross shaft 95 supported in bearings 96 and 97 carried on the vertical flange 70, as best shown in Fig. 2.

The shipper 94 has depending arms 98 provided with slotted ends 99 engaging rollers 100 carried on a ring 101 supported within a groove of the clutch collar 91, as in conventional clutch construction.

The end of the shaft 95 adjacent the driver's side of the machine carries a lever arm 102 that connects by a rod 103 with a shifting lever 104 pivotally supported on the steering wheel post, as shown in Fig. 1, so that the shafts may be selectively engaged or disengaged by the operator to connect the shaft 84 in driving relation with the crank shaft of the motor. The shaft 84 has a reduced extension projecting beyond the bearing 85 and mounts a pulley 105 which is secured thereto by keys 106 and a set screw 107. Fixed to the forward end of the power shaft 66 in alignment with the pulley 105 is a pulley 108.

The end of the flange 71 opposite that supporting the bearing 68 is cut away and bent downwardly as at 109 to mount a bearing supporting bracket 110 that cooperates with a similar bracket 111 welded to the inner side of the vertical flange 70, as best shown in Fig. 3.

The brackets are provided with slotted openings 112 and 113 to attach bearings 114 and 115 which journal an idler pulley shaft 116. The bearings 114 and 115 have flanges 117 that are clampingly retained against the brackets by fastening devices, such as bolts 118 extending through the flanges and through the slots 112 and 113 of the brackets.

The bearings are shifted on the brackets by set screws 120 having their shanks threaded through laterally extending ears 121 at the lower ends of the brackets and bearing against the lower flanges 117 of the bearings, as best shown in Figs. 2 and 3.

Keyed to the outer end of the shaft 116 in registering alignment with the pulleys 105 and 108 is an idler pulley 122. Operating in grooves in the pulley 105 and over the idler pulley 122 is a plurality of endless belts 123 having their upper runs extending through grooves 124 in the driving pulley 105 so that the belts are actuated thereby to effect rotation of the power shaft. The belts are tensioned to obtain desired driving contact with the pulleys by adjusting the idler pulley 122 through manipulation of the set screws 120.

In order to raise and lower the sickle unit and support it in any selected elevational position, I provide a raising and lowering mechanism, as now to be briefly described.

The raising and lowering mechanism includes a hand lever 125 and is fixed to a shaft 126 oscillatably journalled in a bearing bracket 127 carried on the side sill 3, as shown in Fig. 1. Fixed on the outer end of the shaft is a forwardly extending arm 128 that is connected with the sickle supporting yoke by a flexible connection, such as a chain 129.

The inner end of the shaft 126 has an oppositely extending arm 130 that connects with a balancing mechanism such as a spring 131.

The actuating lever 125 is retained in any selected position by a pawl 132 engageable with the teeth of a rack 133 fixed to the bracket 127, the pawl being manipulated by a release button 134 carried by the handle of the lever.

In order to swing the sickle bar about its pivotal axis, as when adjusting angular position thereof, I provide an actuating mechanism including a shaft 135 which extends longitudinally of the chassis alongside the driver's seat and has its ends rotatably supported in bearing brackets 136 and 137.

Fixed on the forward end of the shaft 135 are grooved pulleys 138 and 139 of differential diameter. Carried by the bracket at the rear end of the shaft is a housing 140 for enclosing a worm and worm gear (not shown) actuated by a horizontally extending shaft 141 rotatably supported in a transverse extension of the housing. Fixed on the outer end of the shaft 141 is a hand wheel 142 having a rim 143 adapted to be engaged by a brake 144. The brake 144 is mounted on a rock shaft 145 carried on the platform in spaced bearings 146.

Fixed to the end of the rock shaft in convenient reach of the operator is a foot pedal 147 whereby the brake may be moved to and from braking relation with the rim of the wheel. Fixed within the groove of the larger pulley 139 is the end of a cable 148 having its opposite end extending over and anchored to an arcuate arm 149 fixed to the sickle shoe so that when the pulley 139 is rotated to wind the cable thereon, the sickle is raised from a lower to an upper position.

Wound upon the smaller pulley is a similar cable 150 having one end fixed thereto and its opposite end extending over a guide sheave 151 and connected with a tension spring 152 having its opposite end attached to the chassis frame. The raising and lowering mechanisms for changing the cutting height and angle of the sickle specifically form no part of the present invention, since they are illustrated, described and claimed in my co-pending application on "Mowing machine," Serial No. 199,474, filed on or about April 1, 1938, which has matured into Patent No. 2,187,981 of January 23, 1940.

In operating the machine constructed and assembled as described, and assuming that the sickle is supported in carrying position with the toe thereof slightly inclining over the chassis, the motor is started to propel the machine. The power take-off clutch will, of course, be disengaged so that the sickle is idle.

Upon reaching the place of operation, the lever 125 is released by disengagement of the pawl 132 thereon with the rack 133. This is effected by operation of the release button 134, as described in the above mentioned copending application.

The entire sickle unit is now free to be lowered upon release of the brake 144 and rotation of the hand wheel 142 to pay out the cable 148.

Upon release of the hand lever 125 and rotation of the hand wheel, the sickle, sickle shoe, and its carrying yoke swing downwardly about the axis of the power shaft 84 on the ball and socket connections until the sickle has passed perpendicular position, whereupon the sickle begins to swing downwardly towards horizontal position. The shoe of the sickle may be stopped at any selected position by reengaging the pawl of the lever 125 with the rack 133 and the angular position of the sickle may be maintained by releasing the hand wheel and allowing engagement of the brake in the same manner, as disclosed in the above entitled application.

When the sickle is in desired cutting position, the operator then effects engagement of the power take-off clutch 80 through actuation of the lever 104 so as to establish driving connection between the tubular extension and the shaft 84. When driving connection is established, the pulley 105 drives the belts 123 to effect rotation of the power shaft, the power shaft in turn rotating the crank shaft through the pulleys 59 and 60, and the belts 61 to effect reciprocation of the cutter bar. Owing to the fact that the sickle carrying shoe is suspendingly supported for swinging movement about the axis relatively to the axis of the power shaft, the shoe may be raised and lowered through the lever 125 at the will of the operator without affecting tension of the driving belts.

It is apparent that the belts produce a silent positive driving connection entirely free of vibration and back lash, and that the driving mechanism operates with a minimum power loss.

What I claim and desire to secure by Letters Patent is:

1. In a mowing machine chassis having front and rear wheels, a power shaft, a sickle shoe, arms connected with the sickle shoe, ball and socket joints located in axial alignment with the power shaft and between said front and rear wheels for flexibly connecting the arms with the chassis in the axis of the power shaft, a sickle operating shaft on the shoe, and a driving connection between said shafts.

2. In a mowing machine chassis, a sickle shoe, arms connected with the sickle shoe, ball and socket joints connecting the arms with the chassis, one of said joints having an axial opening extending therethrough, a power shaft extending loosely through said opening, a sickle operating shaft on the shoe, pulleys on the respective shafts, and belts operating over the pulleys.

3. In a mowing machine, a chassis, arms pivotally connected with the chassis, a plate connecting the arms, a sickle unit including a shoe supporting plate having pivotal support on the connecting plate, a screw on one of the plates and engageable with the other to effect movement of the shoe supporting plate on the connecting plate, and means selectively clamping the plates together.

4. In a mowing machine, a motor unit having a crank-shaft projecting from the front of the motor unit, a tubular extension connected with the front end of the crank shaft, anti-friction bearings in the tubular extension, an aligning shaft having a pilot rotatably mounted in said bearings, a clutch connecting the tubular extension with the aligning shaft, a power shaft extending rearwardly alongside the motor unit, pulleys on the respective shafts, belts operating over the pulleys to drive the power shaft upon engagement of the clutch, a sickle unit, means pivotally supporting the sickle unit on the side of the machine nearest the power shaft, and a driving connection between the power shaft and the sickle unit.

5. In a mowing machine, a motor unit at the front of the machine having a crank shaft, a tubular extension connected with the front end of the crank shaft, anti-friction bearings in the tubular extension, an aligning shaft having a pilot rotatably mounted in said bearings, a clutch connecting the tubular extension with the aligning shaft, a power shaft extending rearwardly alongside the motor unit, pulleys on said power and aligning shafts, and belts operating over the pulleys to drive the power shaft upon engagement of the clutch.

6. A mowing machine including a chassis having front and rear wheels, a motor on the chassis having a crank shaft arranged in a fore and aft direction with respect to the chassis, a sickle unit pivotally supported from the side of the chassis between the front and rear wheels, a selective speed driving connection between the rear end of the crank shaft and the rear wheels to propel the machine, a shaft extending alongside the motor concentrically of the pivotal support of the sickle unit, a driving connection between the front ends of the shaft and crank shaft, and a sickle driving mechanism connecting the sickle of said unit with said shaft, whereby the sickle is operated at a speed proportional to that of the motor and independent of said wheel drive.

7. A mowing machine including a chassis having front and rear wheels, a motor on the chassis having a crank shaft arranged in a fore and aft direction with respect to the chassis, a sickle unit supported from the side of the chassis between the front and rear wheels, a selective speed driving connection between the rear end of the crank shaft and the rear wheels to propel the machine, a power shaft extending alongside of the motor in substantially parallel relation with the crank shaft, a driving connection between the front end of the crank shaft and the power shaft, and a driving connection between the rear end of the power shaft and the sickle unit.

8. In a power driven self-propelled mower, a four-wheeled frame, a power shaft, means rotatably supporting the power shaft on the frame substantially parallel with the fore and aft axis thereof, a sickle carrying frame, ball and socket joints connected with the wheeled frame intermediate the front and rear wheels thereof and arranged to operate about the axis of the power shaft, a sickle shoe, means pivotally connecting the sickle shoe with the sickle carrying frame to oscillate about an axis parallel with the axis of the power shaft, a crank shaft, means rotatably supporting the crank shaft coaxially with the last named axis, a driving connection between said shafts, means for pivotally moving the sickle carrying frame on said ball and socket joints, and means for pivoting said sickle shoe on the sickle carrying frame.

9. In a power driven self-propelled mower, a chassis frame, front and rear wheels supporting said frame, a power shaft rotatably supported by the chassis frame, a ball-like trunnion fixed to the chassis frame adjacent the front wheel and having a bore passing said power shaft, a ball-like trunnion spaced from the end of the power shaft and aligning with the first named trunnion, a sickle carrying frame including arms having sockets engaging said ball-like trunnions, a crank shaft rotatably supported on the sickle carrying frame, a sickle shoe oscillatably mounted about the axis of the crank shaft, a driving member fixed to the end of the power shaft adjacent said last named trunnion, a driven member fixed to the crank shaft, flexible connecting means operating over said members, means carried by the chassis frame for raising and lowering the sickle carrying frame, and separate means for pivoting the sickle shoe on the sickle carrying frame.

10. In a mower of the character described, a chassis, a motor on the chassis having a crank shaft extending in a fore and aft direction to the chassis, a power shaft rotatably supported by the chassis alongside the motor in substantially parallel relation with the motor crank shaft, a flexible driving connection between the forward end of the power shaft and the motor crank shaft, a sickle carrying frame, ball and socket joints pivotally connecting the sickle carrying frame for pivotal movement about the opposite end of the power shaft, a crank shaft mounted on the sickle carrying frame, a sickle having operative connection with the crank shaft on the sickle carrying frame, and a flexible driving connection between the power shaft and said crank shaft on the sickle carrying frame.

11. In a mower of the character described, a chassis, a motor on the chassis having a crank shaft extending in a fore and aft direction to the chassis, a power shaft rotatably supported by the chassis in substantially parallel relation with the motor crank shaft, a flexible driving connection between the forward end of said power shaft and the motor crank shaft, a sickle carrying frame, means pivotally connecting the sickle carrying frame for pivotal movement about the opposite end of the power shaft, a crank shaft mounted on the sickle carrying frame and having parallel relation with the power shaft, a sickle having operative connection with the crank shaft on the sickle carrying frame, and a flexible driving connection between the power shaft and said crank shaft on the sickle carrying frame.

12. In a power driven self-propelled mower, a chassis frame, front and rear wheels supporting said frame, a motor unit carried at the front end of the frame, a power shaft rotatably supported on the chassis frame and extending in parallel relation with the motor unit on one side of said frame, a flexible driving connection between the front of the power shaft and the motor unit, a ball-like trunnion fixed to the chassis frame adjacent the front wheel and having a bore passing said shaft, a ball-like trunnion spaced from the end of the power shaft and aligning with the first named trunnion, a sickle carrying frame including sockets engaging said ball-like trunnions, a sickle carried by the sickle carrying frame, and a driving connection between the power shaft and the sickle.

FRED P. MARTIN.